US011953854B2

(12) United States Patent
Kimura

(10) Patent No.: US 11,953,854 B2
(45) Date of Patent: Apr. 9, 2024

(54) POWDER COLLECTION CONTAINER AND IMAGE FORMING APPARATUS INCLUDING THE SAME

(71) Applicant: SHARP KABUSHIKI KAISHA, Sakai (JP)

(72) Inventor: Satoshi Kimura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/888,386

(22) Filed: Aug. 15, 2022

(65) Prior Publication Data

US 2023/0069650 A1 Mar. 2, 2023

(30) Foreign Application Priority Data

Sep. 1, 2021 (JP) ................................ 2021-142536

(51) Int. Cl.
*G03G 21/12* (2006.01)
*G03G 15/08* (2006.01)
*G03G 21/10* (2006.01)

(52) U.S. Cl.
CPC ......... *G03G 21/12* (2013.01); *G03G 15/0886* (2013.01); *G03G 21/105* (2013.01); *G03G 2221/1624* (2013.01)

(58) Field of Classification Search
CPC ............... G03G 21/12; G03G 15/0886; G03G 2221/1624
See application file for complete search history.

(56) References Cited

U.S. PATENT DOCUMENTS 8,526,847 B2 * 9/2013 Kataoka ............ G03G 15/0893 399/106
9,128,457 B2 * 9/2015 Koga .................. G03G 21/105
10,802,421 B2 * 10/2020 Tojo .................. G03G 15/0891
2021/0286311 A1 * 9/2021 Saiki .................. G03G 21/105

FOREIGN PATENT DOCUMENTS

JP 2018-031968 A 3/2018

* cited by examiner

*Primary Examiner* — Walter L Lindsay, Jr.
*Assistant Examiner* — Milton Gonzalez
(74) *Attorney, Agent, or Firm* — ScienBiziP, P.C.

(57) ABSTRACT

A powder collection container accommodates a powder discharged from a discharge port of a powder discharge device including a powder discharger provided with a shutter member that opens and closes the discharge port. The powder collection container includes a moving member that is movable between a first position where the moving member abuts against the shutter member to open the discharge port of the powder discharge device, and a second position where the moving member does not abut against the shutter member and the discharge port of the powder discharge device is not opened.

8 Claims, 16 Drawing Sheets

POWDER COLLECTION CONTAINER AND IMAGE FORMING APPARATUS INCLUDING THE SAME

BACKGROUND OF THE INVENTION

Field of the Invention

The present disclosure relates to a powder collection container and an image forming apparatus such as a copying machine, a multifunction machine, a printer device, and a facsimile device, including the powder collection container.

Description of the Background Art

The powder collection container for accommodating a powder discharged from a discharge port of a powder discharger is provided in, for example, an image forming apparatus and is provided attachably to and detachably from an image forming apparatus main body.

For example, the powder collection container provided in the image forming apparatus discharges, for example, toner waste discharged from a cleaning device acting as a powder discharge device, and/or discharges, from a developing device, developing agent waste in a developing tank of the developing device (a developing device of so-called trickle development type) acting as the powder discharge device. Here, the cleaning device collects and discharges to the powder collection container, toner waste remaining on an image carrier such as a photosensitive drum without being transferred to an intermediate transfer body such as an intermediate transfer belt or a recording sheet such as a recording paper sheet, or toner waste remaining on the intermediate transfer body without being transferred to the recording sheet. The developing device of trickle development type supplies toner, together with new carrier, to a developing tank, and discharges developing agent waste containing deteriorated carrier from the developing tank to a powder collection container.

The powder discharger of the powder discharge device may be provided with a shutter member that opens and closes the discharge port, for example. In this case, for example, a technique is well known in which, when the powder collection container is attached to an image forming apparatus main body, the shutter member of the powder discharger is opened, and a powder conveyed by a conveyance member (a conveyance screw that is being rotated) during operation and discharged from the discharge port is accommodated in the powder collection container in a state where the shutter member of the powder discharger is opened.

When the image forming apparatus is transported (for example, during shipping from a factory or moving after installation), such a powder collection container may be transported in a state of being attached to the image forming apparatus main body, from the viewpoint of minimizing a packaging format. In this case, in the powder discharge device, due to vibration or an impact during transport, the powder in the powder discharge device may leak from the discharge port to the powder collection container via a gap in the conveyance member (the conveyance screw of which rotation is stopped) during an operation stop. Conventionally, to prevent leaking of the powder to the powder collection container, a leakage prevention sheet for transportation is attached to the discharge port of the powder discharger to seal the discharge port of the powder discharger by the leakage prevention sheet. However, the operability of an operation performed to avoid leaking of the powder during transportation is poor, and further, depending on the method by which the leakage prevention sheet is attached to the discharge port, it may not be possible to sufficiently seal the discharge port and the powder may leak from the discharge port to the powder collection container by a vibration or an impact during transportation.

Therefore, an object of the present disclosure is to provide a powder collection container and an image forming apparatus including the powder collection container, by which it is possible to effectively prevent powder from leaking from a discharge port to a powder collection container due to vibration or an impact during transportation, and to improve the operability of an operation performed to avoid leaking of the powder during transportation.

SUMMARY OF INVENTION

To solve the problems described above, the present disclosure provides the following powder collection container and image forming apparatus.

(1) Powder Collection Container

A powder collection container according to the present disclosure is a powder collection container for accommodating a powder discharged from a discharge port of a powder discharge device including a powder discharger provided with a shutter member that opens and closes the discharge port. The powder collection container includes a moving member that is movable between a first position where the moving member abuts against the shutter member to open the discharge port of the powder discharge device, and a second position where the moving member does not abut against the shutter member and the discharge port of the powder discharge device is not opened.

(2) Image Forming Apparatus

An image forming apparatus according to the present disclosure includes the powder collection container according to the present disclosure.

According to the present disclosure, it is possible to effectively prevent powder from leaking from the discharge port to the powder collection container due to vibration or an impact during transportation, and improve the operability of an operation performed to avoid leaking of the powder during transportation.

DESCRIPTION OF THE PREFERRED EMBODIMENTS

Figure 1:
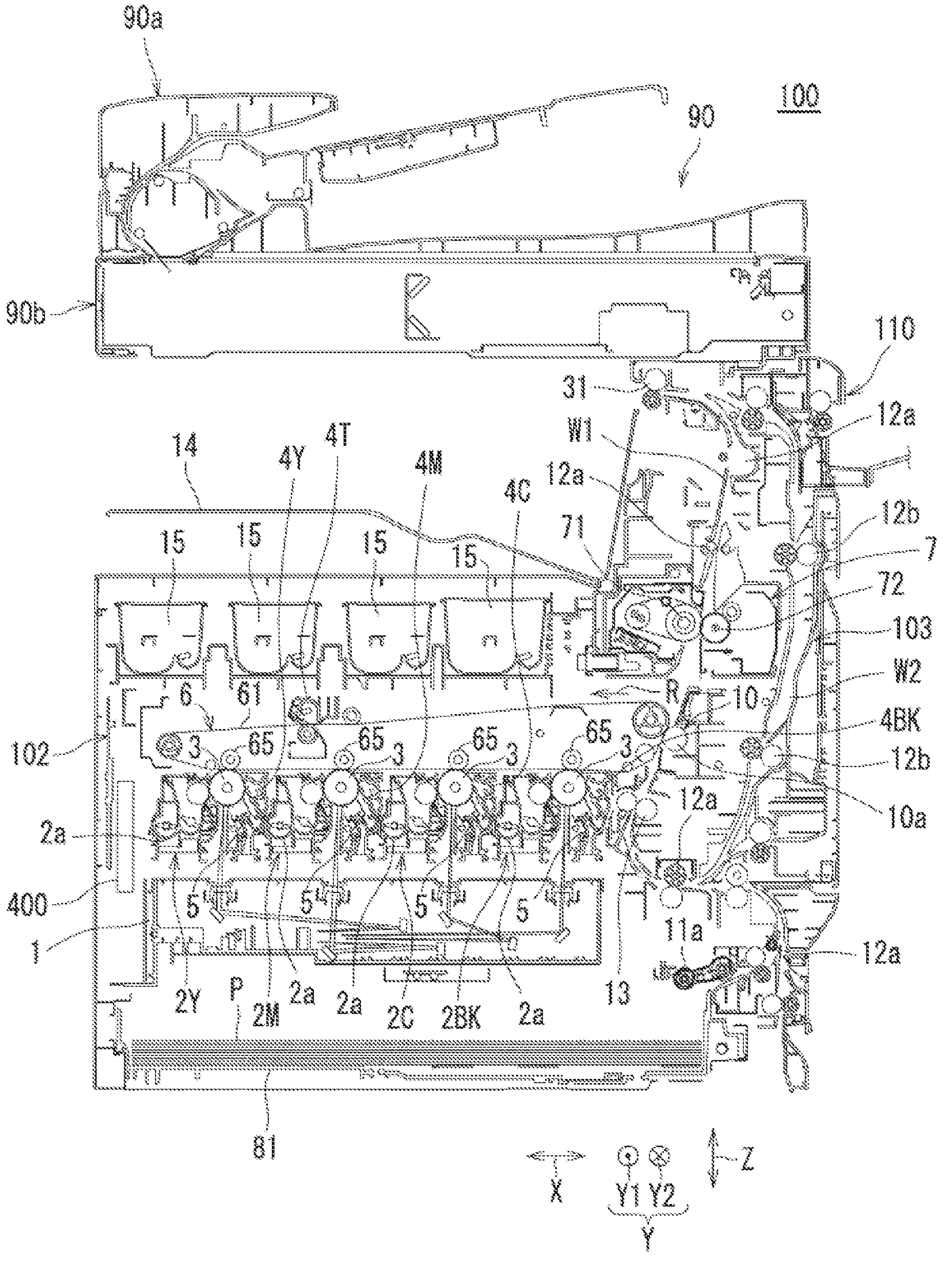
FIG. 1 is a schematic cross-sectional view of an image forming apparatus according to the present embodiment as viewed from a front.

An embodiment according to the present disclosure will be described below with reference to the drawings. In the following description, same components are denoted by the same reference numerals. The names and functions of the same components are also the same. Therefore, detailed description thereof will not be repeated.

Figure 2:
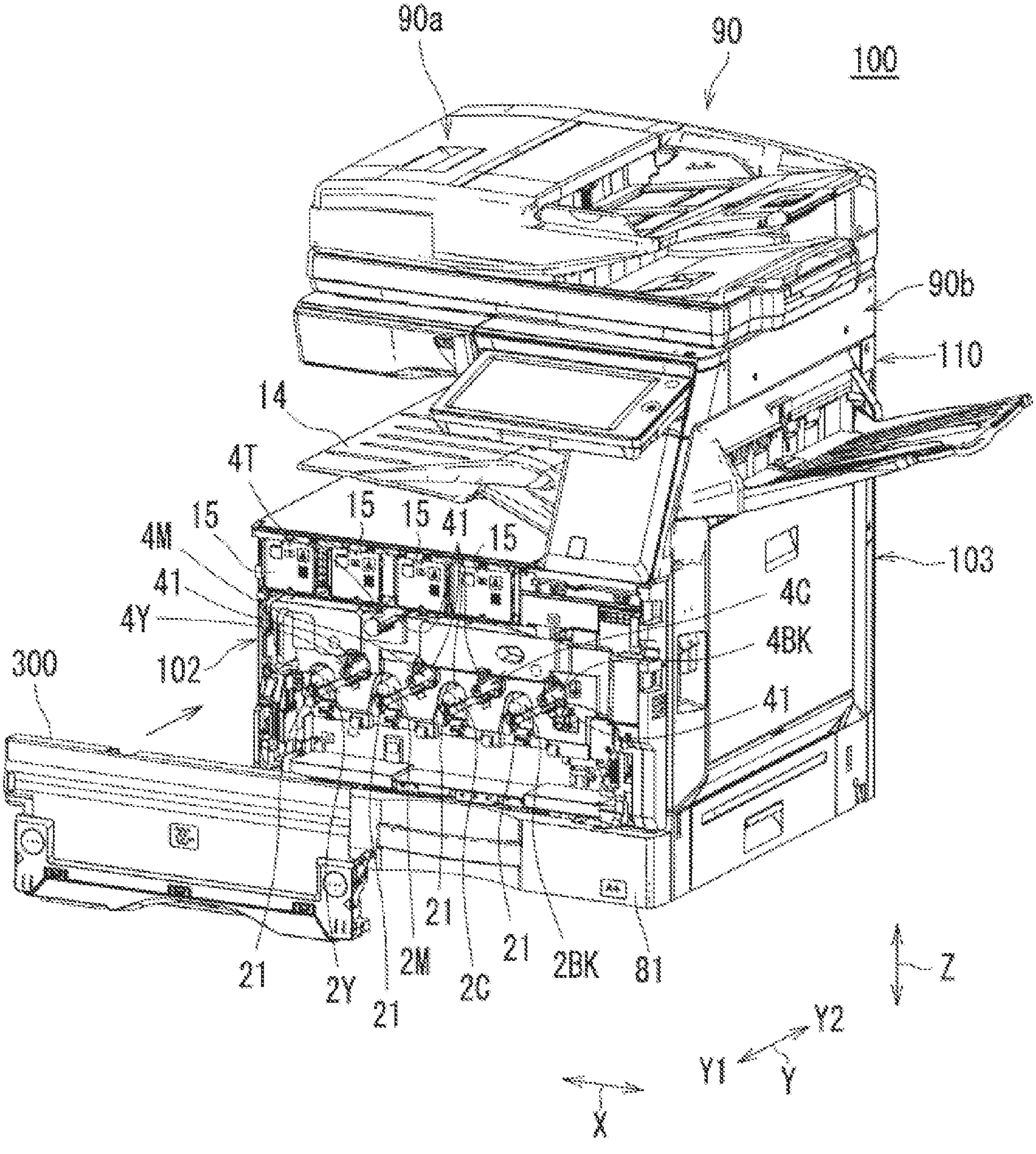
FIG. 2 is an exploded perspective view of the image forming apparatus illustrated in FIG. 1 in a state where an opening/closing door is removed and a powder collection container is detached, as viewed from obliquely above on a front side.

Image Forming Apparatus FIG. 1 is a schematic cross-sectional view of an image forming apparatus 100 according to the present embodiment as viewed from a front. FIG. 2 is an exploded perspective view of the image forming apparatus 100 illustrated in FIG. 1 in a state where an opening/closing door is removed and a powder collection container 300 is detached, as viewed from obliquely above on a front side. In the drawings, reference numeral X represents a left-right direction, reference numeral Y represents a depth direction, and reference symbol Z represents an up-down direction (a vertical direction), respectively.

The image forming apparatus 100 according to the present embodiment is a color image forming apparatus that forms multicolor and monochromatic images on a recording sheet P such as a paper sheet. The image forming apparatus 100 performs an image forming process based on image data read by a document reading device 90 or image data transmitted from outside. The image forming apparatus 100 may be a color image forming apparatus having other aspects. The image forming apparatus 100 may be a monochrome image forming apparatus.

The image forming apparatus 100 includes the document reading device 90 and an image forming apparatus main body 110. The image forming apparatus main body 110 is provided with an image former 102 and a sheet conveyance system 103.

The image former 102 includes an exposure device 1 (exposure unit), a plurality of developing devices 2BK, 2C, 2M, and 2Y (developing units), a plurality of photosensitive drums 3 to 3 acting as image carriers, a plurality of cleaning devices 4BK, 4C, 4M, and 4Y (photosensitive body cleaning units), a plurality of charging devices 5 to 5, an intermediate transfer belt device 6, a cleaning device 4T (a belt cleaning unit), a plurality of toner cartridges 15 to 15, and a fixing device 7 (fixing unit). The sheet conveyance system 103 includes a paper feed tray 81, a discharge roller 31, and a discharge tray 14. Here, BK, C, M, and Y refer to black, cyan, magenta, and yellow, respectively. The intermediate transfer belt device 6 includes a plurality of intermediate transfer rollers 65 to 65 and an intermediate transfer belt 61. The intermediate transfer rollers 65 to 65 are provided within the intermediate transfer belt 61. The intermediate transfer belt 61 circularly moves in a predetermined circular movement direction R. The intermediate transfer rollers 65 to 65 transfer toner images of each color formed on surfaces of the photosensitive drums 3 to 3 to the intermediate transfer belt 61 in an overlapping manner while being driven and rotated by the circular movement of the intermediate transfer belt 61.

The document reading device 90 that reads an image of a document (not illustrated) is provided above the image forming apparatus main body 110. The document reading device 90 reads an image of a document, and includes a document conveyor 90*a* and a document reader 90*b*. The document reading device 90 reads an image of a document by the document reader 90*b* while conveying the document by the document conveyor 90*a*, or scans and reads, by the document reader 90*b*, a document placed on a platen of the document reader 90*b*. The image of the document read by the document reading device 90 is transferred, as image data, to the image forming apparatus main body 110 and the image is recorded on the recording sheet P.

The image forming apparatus main body 110 is provided with a sheet conveyance path W1. A sheet feeder 11*a* supplies the recording sheet P to the sheet conveyance path W1. The sheet conveyance path W1 guides the recording sheet P to the discharge tray 14 via a transfer roller 10*a* of a secondary transfer device 10 and the fixing device 7. The fixing device 7 heat-fixes the toner image formed on the recording sheet P to the recording sheet P. The sheet feeder 11*a*, a plurality of conveyance rollers 12*a* to 12*a*, a resist roller 13, the transfer roller 10*a*, a fixing roller 71 and a pressure roller 72 in the fixing device 7, and the discharge roller 31 are arranged in the vicinity of the sheet conveyance path W1.

In the image forming apparatus 100, the recording sheet P supplied from the paper feed tray 81 by the sheet feeder 11*a* is conveyed to the resist roller 13 via the conveyance rollers 12*a* to 12*a*. Subsequently, the recording sheet P is conveyed by the resist roller 13 to the transfer roller 10*a* at a timing when the recording sheet P is aligned with the toner image on the intermediate transfer belt 61, and the toner image is transferred onto the recording sheet P by the transfer roller 10*a*. After that, the recording sheet P passes through the fixing roller 71 and the pressure roller 72 in the fixing device 7, and is discharged onto the discharge tray 14 via the conveyance rollers 12*a* to 12*a* and the discharge roller 31. If an image is formed not only on a front side of the recording sheet P but also on a back side, the recording sheet P is conveyed in a reverse direction from the discharge roller 31 to a reversal sheet conveyance path W2. The front and back sides of the recording sheet P are reversed via reversal conveyance rollers 12*b* to 12*b*, and the recording sheet P is guided again to the resist roller 13. Next, the toner image is formed and fixed on the back side of the recording sheet P in much the same way as on the front side and then, the recording sheet P is discharged toward the discharge tray 14.

The developing devices 2BK, 2C, 2M, and 2Y develop an electrostatic latent image on the photosensitive drums 3 to 3 by a two-component developing agent containing a toner and a carrier as main components. In the present example, the developing devices 2BK, 2C, 2M, and 2Y are developing devices of trickle development type. In the toner cartridges 15 to 15, the carrier is mixed to the toner at a constant ratio. In the developing devices 2BK, 2C, 2M, and 2Y, the toner is supplied, together with a new carrier, from the toner cartridges 15 to 15 to developing tanks 2*a* to 2*a*, and developing agent waste containing deteriorated carrier is discharged from the developing tanks 2*a* to 2*a* to the powder collection container 300.

The cleaning devices 4BK, 4C, 4M, and 4Y collect toner waste remaining on the photosensitive drums 3 to 3, which is not transferred to the intermediate transfer belt 61 by the intermediate transfer rollers 65 to 65, and convey the collected toner waste to the powder collection container 300. The cleaning device 4T collects toner waste remaining on the intermediate transfer belt 61, which is not transferred onto the recording sheet P by the transfer roller 10*a* of the secondary transfer device 10, and conveys the collected toner waste to the powder collection container 300.

That is, the developing devices 2BK, 2C, 2M, and 2Y and the cleaning devices 4BK, 4C, 4M, 4Y, and 4T act as powder discharge devices.

Powder Collection Container Next, the powder collection container 300 according to the present embodiment will be described in detail below with reference to FIGS. 3 to 12.

Figure 3:
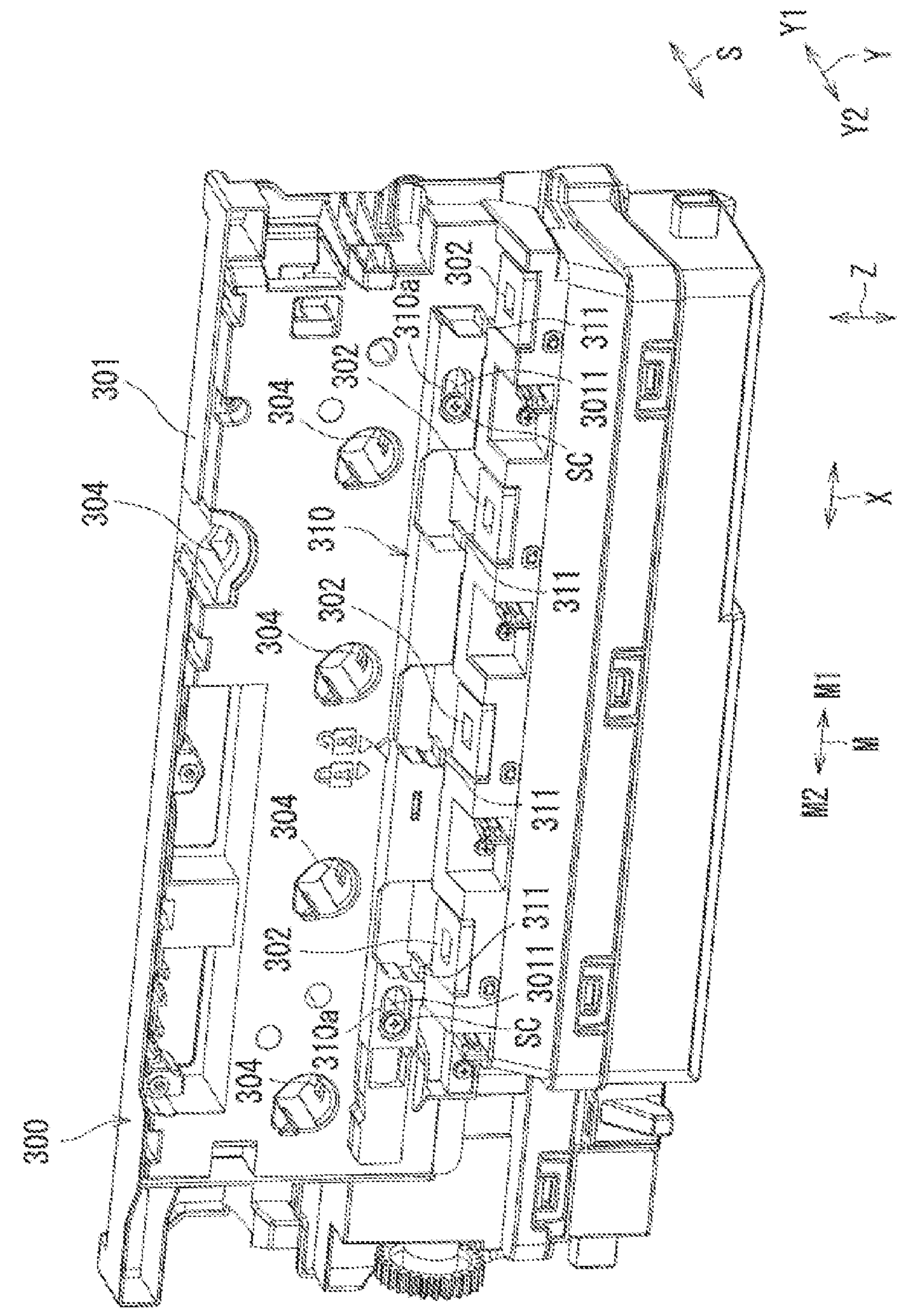
FIG. 3 is a perspective view of the powder collection container illustrated in FIG. 2, as viewed from obliquely above on a rear side.
Figure 4:
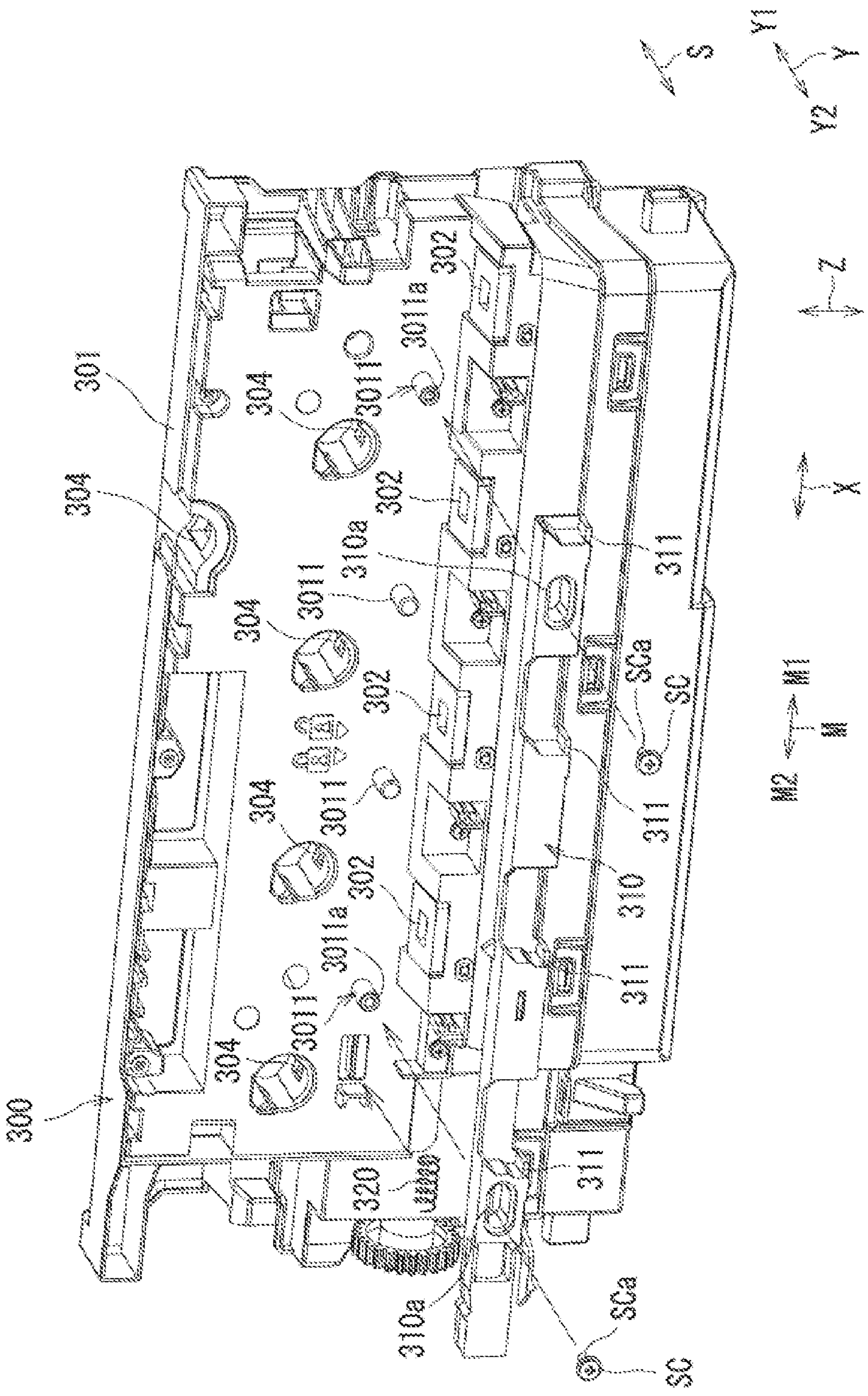
FIG. 4 is an exploded perspective view illustrating a state where a moving member is removed from the powder collection container illustrated in FIG. 3.
Figure 5A:
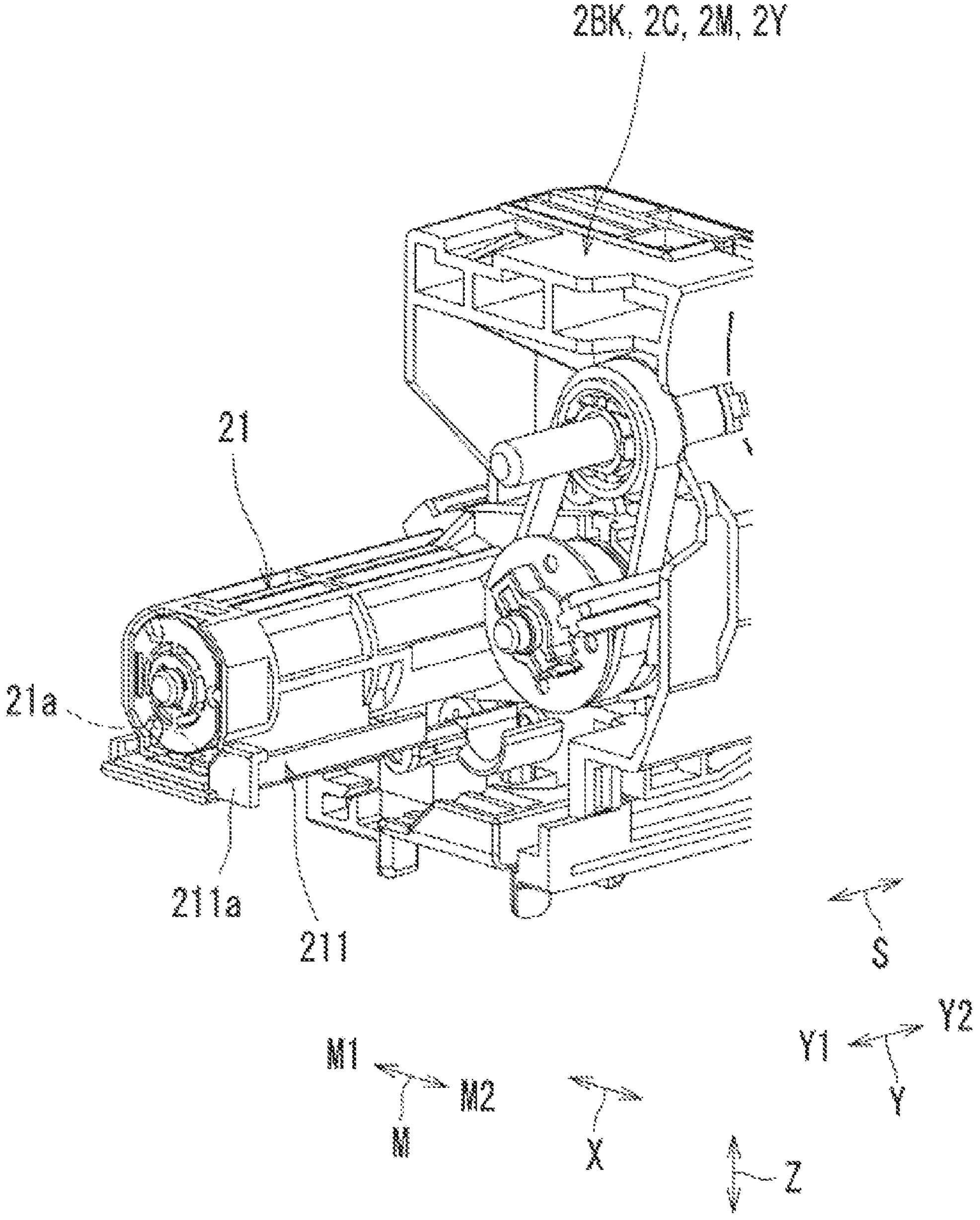
FIG. 5A is a perspective view of a state where a discharge port is not opened by a shutter member.
Figure 5B:
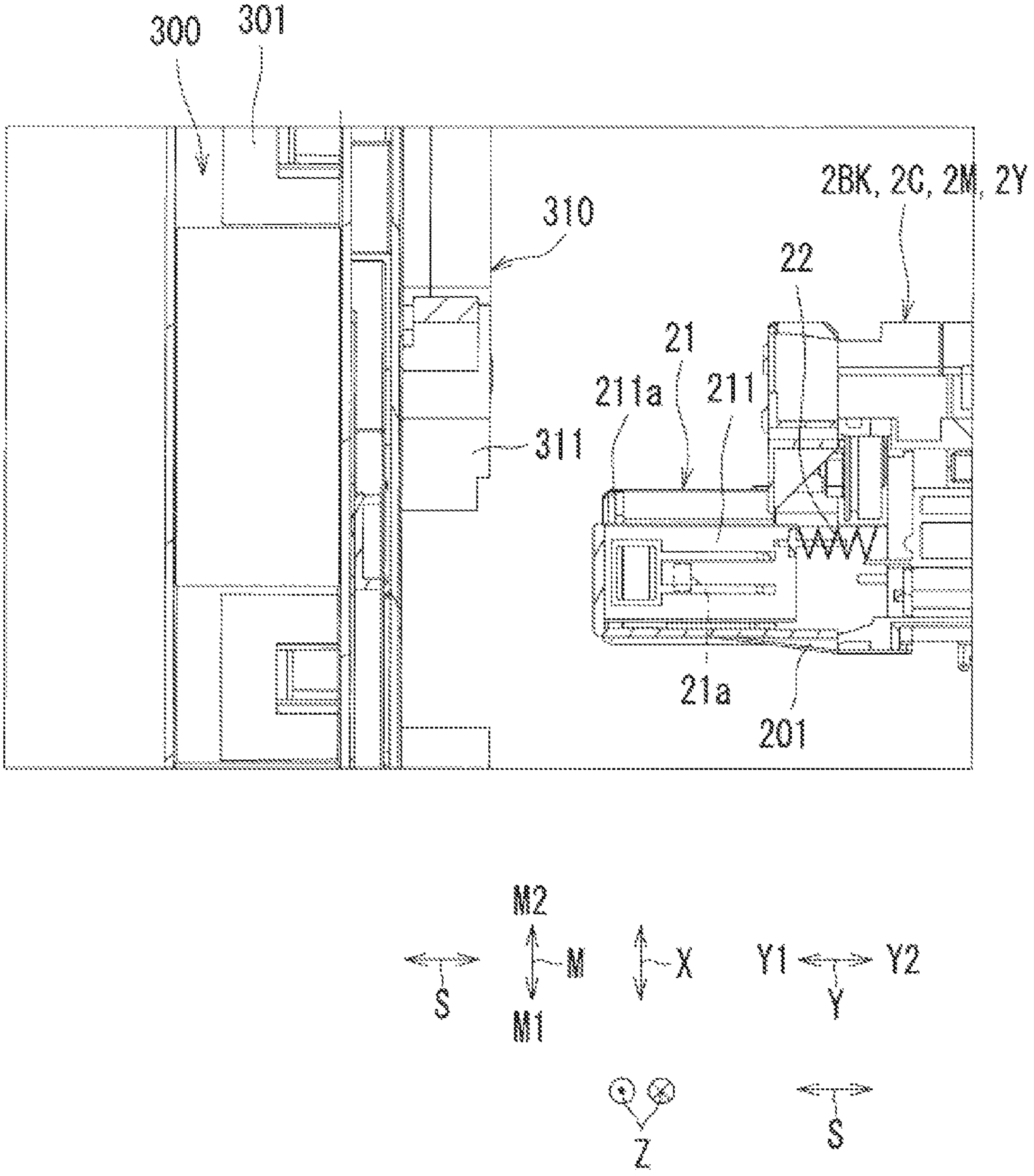
FIG. 5B is a bottom view including a partial cross section of the state where the discharge port is not opened by the shutter member.
Figure 6A:
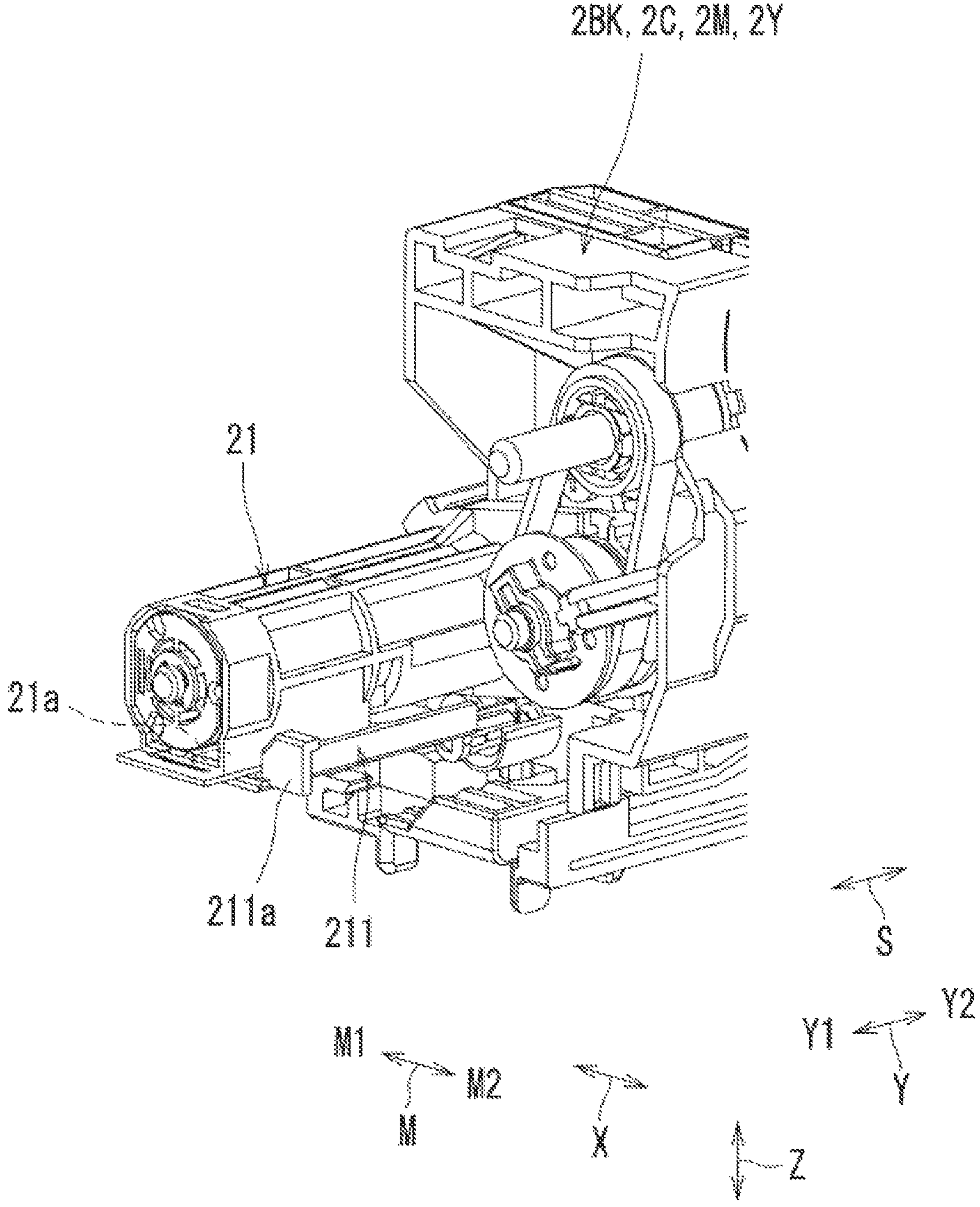
FIG. 6A is a perspective view of a state where the discharge port is opened by the shutter member.
Figure 6B:
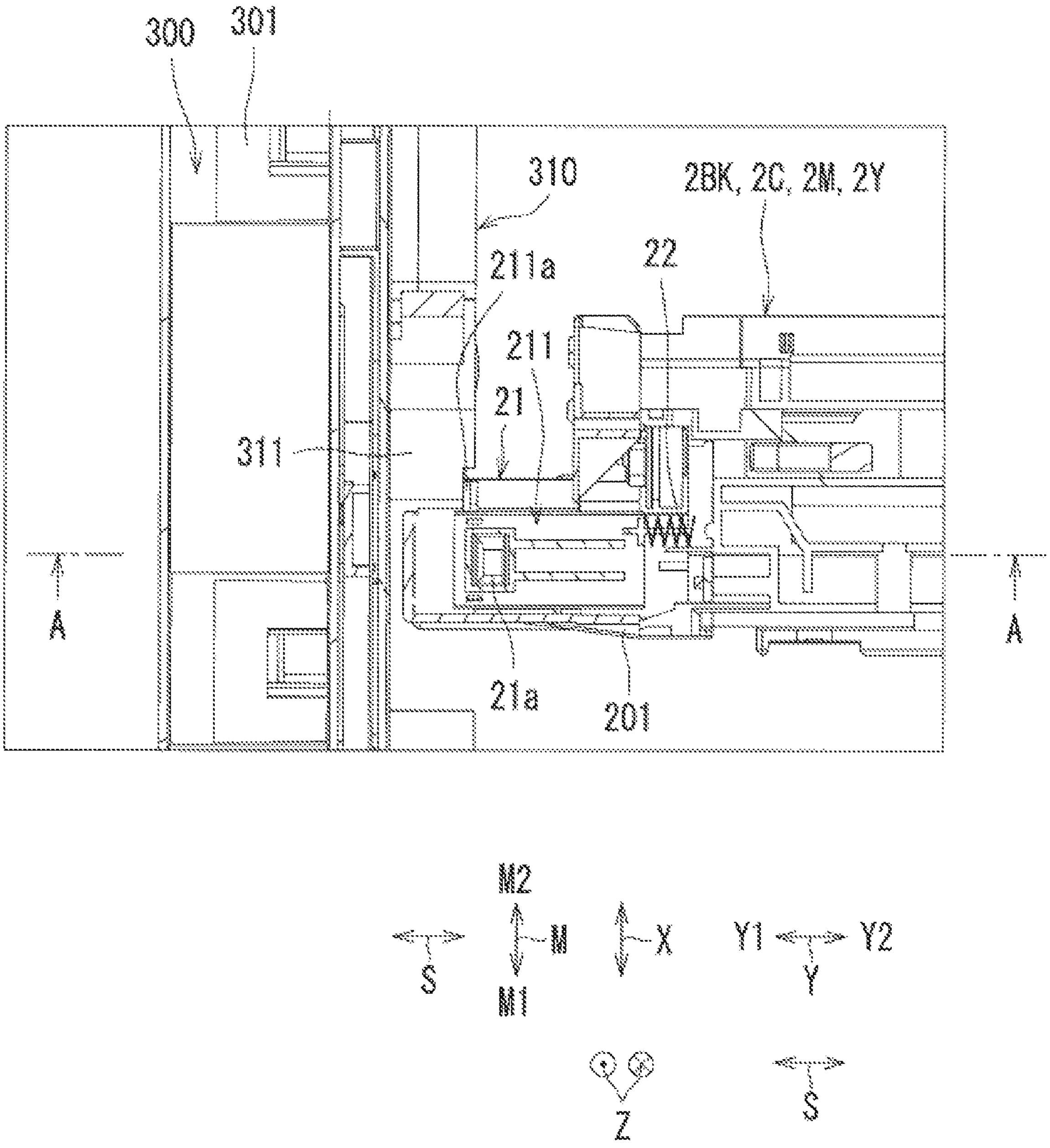
FIG. 6B is a bottom view including a partial cross section of the state where the discharge port is opened by the shutter member.

FIG. 3 is a perspective view of the powder collection container 300 illustrated in FIG. 2, as viewed from obliquely above on a rear side. FIG. 4 is an exploded perspective view illustrating a state where a moving member 310 is removed from the powder collection container 300 illustrated in FIG. 3. FIGS. 5A and 5B respectively illustrate a perspective view and a bottom view including a partial cross section of a state where a discharge port 21*a* is not opened by a shutter member 211. FIGS. 6A and 6B respectively illustrate a perspective view and a bottom view including a partial cross section of a state where the discharge port 21*a* is opened by the shutter member 211. The powder collection container 300 is omitted in FIGS. 5A and 6A.

Figure 7:
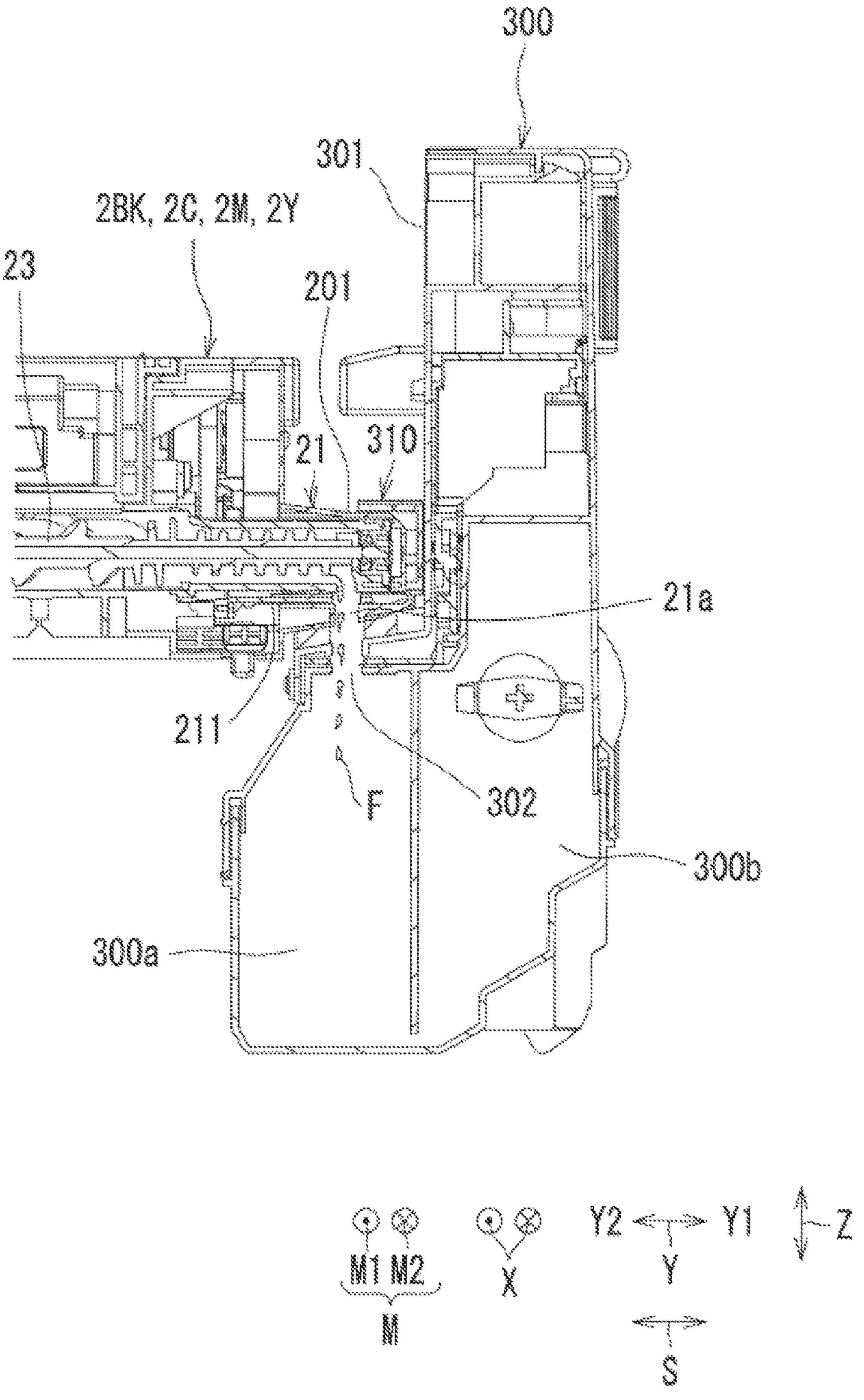
FIG. 7 is a cross-sectional view taken along a line A-A illustrated in FIG. 6B.
Figure 8A:
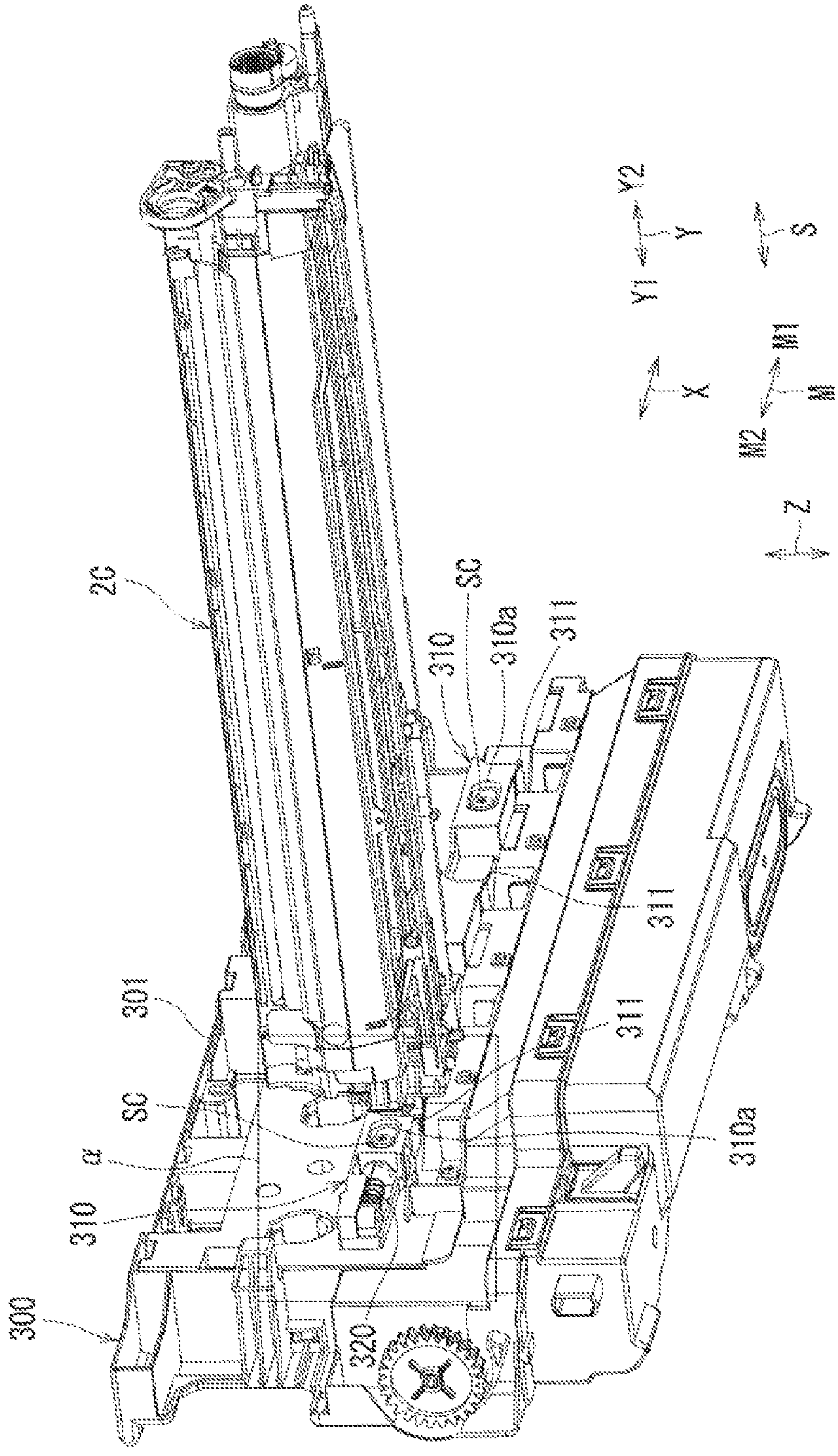
FIG. 8A is a perspective view of where an abutted portion in a powder discharger of a developing device abuts against an abutting portion of the powder collection container, with a part of the moving member cut out.
Figure 8B:
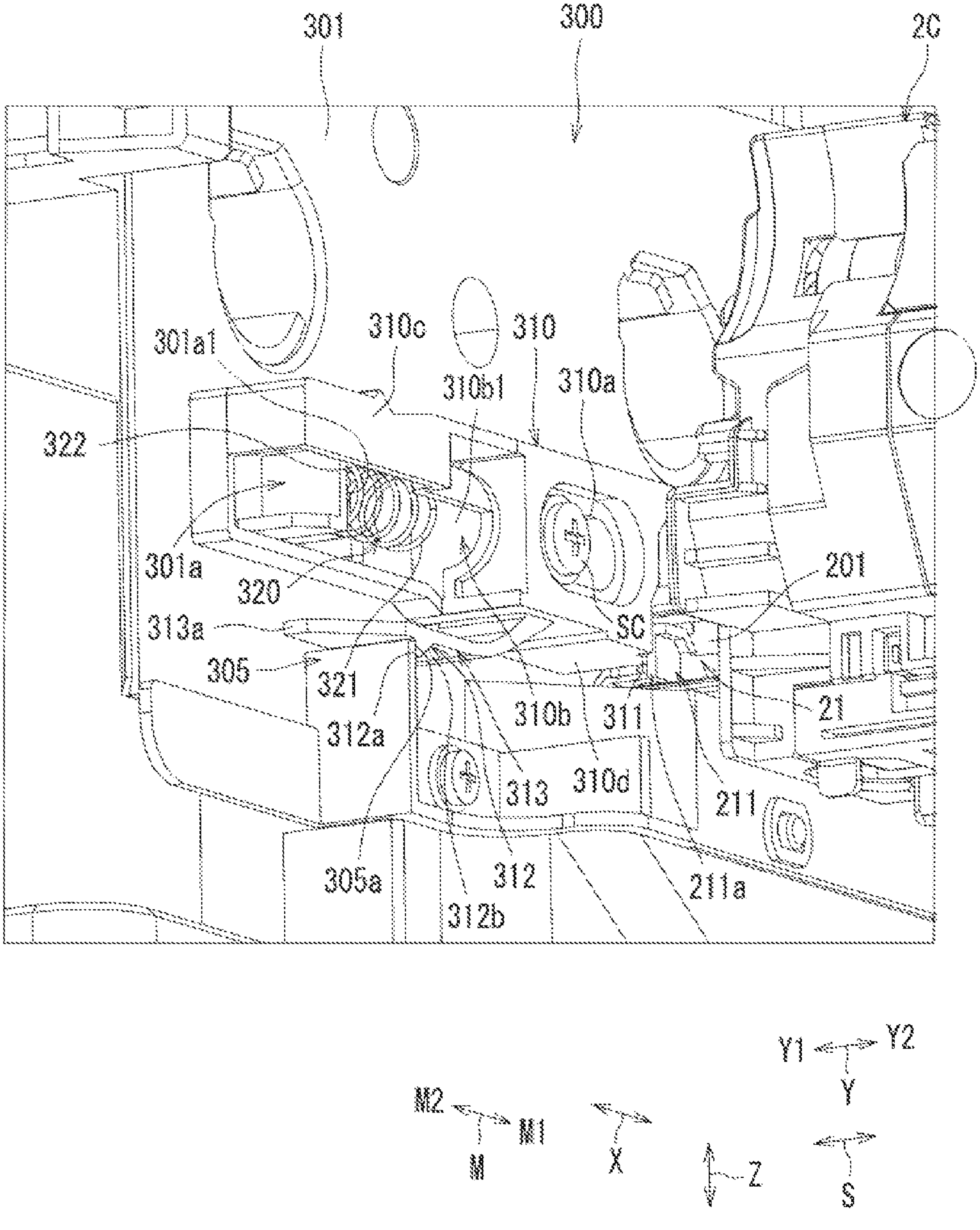
FIG. 8B is an enlarged perspective view illustrating an a frame portion illustrated in FIG. 8A.

FIG. 7 is a cross-sectional view taken along a line A-A illustrated in FIG. 6B. FIG. 8A is a perspective view of where an abutted portion 211*a* in a powder discharger (21) of the developing device 2C abuts against an abutting portion 311 of the powder collection container 300, with a part of the moving member 310 cut out. FIG. 8B is an enlarged perspective view illustrating an a frame portion illustrated in FIG. 8A. FIGS. 8A and 8B illustrate configurations corresponding to the developing device 2C for cyan, but configurations corresponding to the other developing devices 2BK, 2M, and 2Y have the same configuration, and thus, the configurations are represented by the developing device 2C for cyan.

In the image forming apparatus 100, the image former 102 forms (prints) an image by using the toner supplied from the toner cartridges 15 to 15, and the powder discharged from the image former 102 (toner waste and/or developing agent waste, in the present example, toner waste and developing agent waste) is collected in the powder collection container 300.

The powder collection container 300 is attached to the image forming apparatus 100 in the direction of an arrow in FIG. 2 (Y2 direction). Specifically, as illustrated in FIG. 2, the powder collection container 300 is provided on a first side Y1 (in the present example, a front side, an operation side) of a depth direction Y in the image forming apparatus main body 110. Specifically, the powder collection container 300 is removed from the image forming apparatus main body 110 to the first side Y1 in the depth direction Y (the front side in the present example), and is attached from the front side toward a second side Y2 (the rear side in the present example) in the depth direction Y to be mounted to a front surface of the image forming apparatus main body 110.

The powder collection container 300 accommodates a powder F (see FIG. 7) discharged from the image forming apparatus main body 110. Specifically, the powder collection container 300 accommodates the toner waste transported from the cleaning devices 4BK, 4C, 4M, 4Y, and 4T, and the developing agent waste transported from the developing devices 2BK, 2C, 2M, and 2Y. The developing devices 2BK, 2C, 2M, and 2Y (examples of a powder discharge device) each include a powder discharger (developing agent waste dischargers 21 to 21) from which the powder (developing agent waste) is discharged.

The powder collection container 300 is provided with receiving ports 302 to 302 and 304 to 304 for the powder F. The receiving ports 302 to 302 are openings that receive developing agent waste transported from each of the developing devices 2BK, 2C, 2M, and 2Y. In a state where the powder collection container 300 is attached to the image forming apparatus main body 110, the receiving ports 302 to 302 communicate with each of the discharge ports 21*a* of the developing devices 2BK, 2C, 2M, and 2Y (see FIG. 7). The receiving ports 304 to 304 are openings that receive toner waste transported from each of the cleaning devices 4BK, 4C, 4M, 4Y, and 4T. In the state where the powder collection container 300 is attached to the image forming apparatus main body 110, the receiving ports 304 to 304 communicate with each of discharge ports of the cleaning devices 4BK, 4C, 4M, 4Y, and 4T.

The powder collection container 300 includes a developing agent waste collection chamber 300*a* and a toner waste collection chamber 300*b* as powder collection chambers (see FIG. 7). The developing agent waste collection chamber 300*a* is provided on the second side Y2 (the rear side in the present example) in the depth direction Y. The developing agent waste collection chamber 300*a* accommodates, via each of the receiving ports 302 to 302, the developing agent waste transported from the developing devices 2BK, 2C, 2M, and 2Y. The toner waste collection chamber 300*b* is provided on the first side Y1 (the front side, the operation side in the present example) in the depth direction Y. The toner waste collection chamber 300*b* accommodates, via each of the receiving ports 304 to 304, the toner waste transported from the cleaning devices 4BK, 4C, 4M, 4Y, and 4T.

In the developing devices 2BK, 2C, 2M, and 2Y, before the powder collection container 300 is mounted to the image forming apparatus main body 110, as illustrated in FIGS. 5A and 5B, the discharge port 21*a* of the powder discharger (21) is not opened (is closed) by the shutter member 211 urged by an urging force of a first urging member 22 such as a coil spring. On the other hand, when the powder collection container 300 is attached to the image forming apparatus main body 110, as illustrated in FIGS. 6A, 6B, and 7, the abutted portion 211*a* provided in the shutter member 211 abuts against the abutting portion 311 provided in the moving member 310 of the powder collection container 300, so that the shutter member 211 moves to the open side against the urging force of the first urging member 22. Thus, the powder F conveyed by the rotation of a conveyance screw 23 (see FIG. 7) and discharged from the discharge port 21*a* drops into the developing agent waste collection chamber 300*a* of the powder collection container 300 via the receiving port 302 of the powder collection container 300.

Specifically, the shutter member 211 is provided movably between an open position and a closed position of the receiving port 302 in an attachment/detachment direction S (the depth direction Y in the present example) of the powder collection container 300 with respect to the powder discharger (21). The abutted portion 211*a* that abuts against the abutting portion 311 is provided on the side of the abutting portion 311 in the moving member 310 of the shutter member 211. The first urging member 22 is provided between the shutter member 211 and the powder discharger (21) to urge the shutter member 211 toward the side of the closed position.

The powder collection container 300 according to the present embodiment accommodates the powder F discharged from the discharge port 21*a* of the powder discharge device (in the present example, the developing devices 2BK, 2C, 2M, and 2Y) including the powder discharger (21) provided with the shutter member 211 that opens and closes the discharge port 21*a*. The powder collection container 300 includes the moving member 310. The moving member 310 is movable between a first position where the moving member 310 abuts against the shutter member 211 to open the discharge port 21*a* of the powder discharge device (2BK, 2C, 2M, and 2Y), and a second position where the moving member 310 does not abut against the shutter member 211 and the discharge port 21*a* of the powder discharge device (2BK, 2C, 2M, and 2Y) is not opened.

According to the present embodiment, when the moving member 310 (the abutting portion 311) is positioned at the first position, the moving member 310 abuts against the shutter member 211 (the abutted portion 211*a*) so that the discharge port 21*a* is opened. When the moving member 310 (the abutting portion 311) is positioned at the second position, the moving member 310 does not abut against the shutter member 211 (the abutted portion 211*a*) so that the discharge port 21*a* is not opened.

For example, during transportation of the image forming apparatus 100, the moving member 310 can be at the second position. As a result, even when the powder collection container 300 is attached to the image forming apparatus main body 110, the discharge port 21*a* is not opened by the shutter member 211. Thus, even if vibration is generated with respect to the powder discharge device (2BK, 2C, 2M, and 2Y) and/or an impact occurs during transportation, it is possible to surely prevent the powder F in the powder discharge device (2BK, 2C, 2M, and 2Y) from leaking from the discharge port 21*a* to the powder collection container 300 via a gap of a conveyance member (the conveyance screw 23 of which rotation is stopped) during an operation stop.

On the other hand, when the image forming apparatus 100 is installed, the moving member 310 can be at the first position. In this state, the discharge port 21*a* is opened by the shutter member 211, and thus, the powder F conveyed by the conveyance member (by the rotation of the conveyance screw 23) during operation and discharged from the discharge port 21*a* can be accommodated in the powder collection container 300 in the state where the shutter member 211 of the powder discharger (21) is opened. Moreover, a state where the discharge port 21*a* is opened by the shutter member 211 and a state where the discharge port 21*a* is not opened by the shutter member 211 can be realized by a simple operation which is moving the moving member 310 to the second position or the first position, and thus, it is possible to improve the operability of an operation performed to avoid the leaking of the powder F during transportation.

In the present embodiment, the shutter member 211 is provided movably in a predetermined opening/closing direction in a powder discharger main body 201. The powder discharger (21) is provided with the first urging member 22 (see FIGS. 5B and 6B) that urges the shutter member 211 toward the closed side. When the moving member 310 is positioned at the first position (see FIGS. 5A, 5B, 8A, and 8B), the moving member 310 abuts against the shutter member 211 to move the shutter member 211 to the open side against the urging force by the first urging member 22 toward the closed side of the shutter member 211. On the other hand, when the moving member 310 is positioned at the second position (see FIG. 10 described later), the moving member 310 does not abut against the shutter member 211 and the state where the shutter member 211 is closed by the first urging member 22 is maintained.

Thus, it is possible to achieve a state where the shutter member 211 provided movably in the powder discharger main body 201 is urged to the closed side by the first urging member 22. Therefore, it is possible to easily realize a state where the moving member 310 at the first position abuts against the shutter member 211 to open the discharge port 21*a*, and a state where the moving member 310 at the second position does not abut against the shutter member 211 and does not open the discharge port 21*a*.

If the moving member 310 moves to the second position after the image forming apparatus 100 is installed, the moving member 310 does not abut against the shutter member 211 and thus, the discharge port 21*a* is not opened. In this case, the powder F cannot be discharged to the powder collection container 300.

In this respect, the powder collection container 300 according to the present embodiment further includes a second urging member 320 (see FIGS. 4, 8A, and 8B) that urges the moving member 310 toward the first position. The moving member 310 is provided movably in a predetermined movement direction M (in the left-right direction X in the present example) in a powder collection container main body 301, in a state where the moving member 310 is urged toward the first position by the urging force of the second urging member 320.

Thus, by the urging force of the second urging member 320, it is possible to maintain the state where the moving member 310 is positioned at the first position. Therefore, it is possible to effectively prevent the moving member 310 from moving to the second position after the image forming apparatus 100 is installed, and to surely obtain a state where, as a result of abutment against the shutter member 211, the discharge port 21*a* is opened. Thus, the powder F can be surely discharged to the powder collection container 300.

Specifically, the moving member 310 is provided with a plurality of elongated through-holes 310*a* and 310*a* (see FIGS. 3, 4, 8A, and 8B) along the movement direction M through which a fixing member SC is inserted. In the powder collection container main body 301, among four fixation portions 3011 to 3011 arranged in the movement direction M, the fixation portions 3011 and 3011 at both ends of the powder collection container main body 301 are provided at a pitch of the elongated through-holes 310*a* and 310*a*. The fixation portions 3011 to 3011 protrude from the powder collection container main body 301 toward the image forming apparatus main body 110. In the moving member 310, the fixing members SC to SC are fixed to the fixation portions 3011 and 3011 in a state where the fixation portions 3011 and 3011 at both ends of the powder collection container main body 301 are inserted into the elongated through-holes 310*a* and 310*a*. Thus, the moving member 310 can reciprocate with respect to the powder collection container main body 301 along the movement direction M. In the present example, the elongated through-holes 310*a* and 310*a* include male screws SCa (see FIG. 4), and the fixation portions 3011 and 3011 at both ends are provided with female screws 3011*a* (see FIG. 4) to be screwed into the male screws SCa of the elongated through-holes 310*a* and 310*a*.

As illustrated in FIG. 8B, an abutting portion 310*b* that abuts against one end 321 of the second urging member 320 and a cover 310*c* that covers the second urging member 320 are provided at the end of a second position side M2 in the movement direction M of the moving member 310. The powder collection container main body 301 is provided with an abutting portion 301*a* that abuts against the other end 322 of the second urging member 320. The abutting portion 301*a* protrudes from the powder collection container main body 301 toward the image forming apparatus main body 110. The abutting portion 310*b* and the abutting portion 301*a* include abutment surfaces 310*b*1 and 301*a*1 along the up-down direction Z and the attachment/detachment direction S, respectively. The cover 310*c* also covers the abutting portion 301*a* of the powder collection container main body 301. In FIGS. 8A and 8B, the cover 310*c* is cut out for illustration, but the cover 310*c* actually covers the second urging member 320 and the abutting portion 301*a*.

In the powder discharger (21), when the moving member 310 positioned at the first position abuts against the shutter member 211 and the moving member 310 moves the shutter member 211 to the open side, it is desired that the moving member 310 is surely maintained in the first position.

In this regard, in the present embodiment, as illustrated in FIG. 8B, the powder collection container main body 301 is provided with a regulator 305. The regulator 305 regulates a movement of the moving member 310 at the first position, toward the second position in the movement direction M. The moving member 310 is provided with a regulated portion 312. The regulated portion 312 is releasably regulated with respect to the regulator 305.

Thus, the regulator 305 of the powder collection container main body 301 regulates the regulated portion 312 of the moving member 310, whereby the moving member 310 can be surely prevented from moving toward the second position. Therefore, when the regulated portion 312 of the moving member 310 positioned at the first position abuts against the regulator 305 of the powder collection container main body 301 and the moving member 310 is moved to the open side, it is possible to surely maintain the moving member 310 in the first position. The regulation of the regulated portion 312 of the moving member 310 by the regulator 305 of the powder collection container main body 301 can be released, and thus, it is possible to move the moving member 310 toward the second position when the image forming apparatus 100 is transported.

Specifically, the powder collection container main body 301 and the moving member 310 are formed of a resin material. The moving member 310 is provided with a swinger 313 that is flexible. The swinger 313 extends obliquely downward from a bottom surface 310*d* of the moving member 310 to the second position side M2 in the movement direction M at the end of the moving member 310 at the second position side M2 in the movement direction M. The swinger 313 is flexible, a base end side thereof is cantilevered and supported by the moving member 310, and a leading end side thereof is swingable in the up-down direction Z. The regulated portion 312 is provided on the leading end side of the swinger 313. The swinger 313 includes an operation acceptor 313*a* operated by an operator and provided on the leading end side from the swinger 313. The regulator 305 protrudes from the powder collection container main body 301 toward the image forming apparatus main body 110. The regulator 305 and the regulated portion 312 include a regulation surface 305*a* and a regulated surface 312*a* along the up-down direction Z and the attachment/detachment direction S, respectively. When the moving member 310 is positioned at the first position, the regulation surface 305*a* and the regulated surface 312*a* engage with each other.

When the moving member 310 is positioned at the first position in the powder collection container 300 described above, the operator grips the operation acceptor 313*a* of the swinger 313 and causes the operation acceptor 313*a* to swing upward. This allows the engagement between the regulated portion 312 of the moving member 310 and the regulator 305 of the powder collection container main body 301 to be released. Thus, it is possible to easily release the regulation of the regulated portion 312 by the regulator 305. By this release operation, the moving member 310 can be moved to the second position. When the operator releases the operation acceptor 313*a* of the swinger 313, the regulated portion 312 returns to an original position.

In the present embodiment, the image forming apparatus 100 includes the powder collection container 300 that is attachably and detachably provided in the image forming apparatus main body 110.

Thus, the powder discharge device including the powder discharger (21) can be applied to the developing devices 2BK, 2C, 2M, and 2Y of trickle development type and/or the cleaning devices 4BK, 4C, 4M, 4Y, and 4T (in the present example, the developing devices 2BK, 2C, 2M, and 2Y).

In the present embodiment, the powder discharger is at least any one of a toner waste discharger 41 that discharges toner waste and the developing agent waste discharger 21 that discharges developing agent waste (in the present example, the developing agent waste discharger 21). Thus, it is possible to effectively prevent the toner waste and/or the developing agent waste (in the present example, the developing agent waste) from leaking from the discharge port to the powder collection container 300 due to vibration or an impact during transportation, and it is possible to improve the operability of an operation performed to avoid the leaking of the toner waste and/or the developing agent waste (in the present example, the developing agent waste) during transportation.

In the present embodiment, a plurality of the toner waste dischargers 41 and a plurality of the developing agent waste dischargers 21 are provided. When the moving member 310 is positioned at the first position, the moving member 310 abuts against all of the shutter members 211 to 211 in at least any one of the plurality of toner waste dischargers 41 to 41 and the plurality of developing agent waste dischargers 21 to 21 (in the present example, the plurality of developing agent waste dischargers 21 to 21), and thus all of the discharge ports 21*a* to 21*a* are open. When the moving member 310 is positioned at the second position, the moving member 310 does not abut against any of the shutter members 211 to 211, and thus, none of the discharge ports 21*a* to 21*a* are open.

Thus, when the moving member 310 is positioned at the first position, the powder F discharged from all of the discharge ports 21*a* to 21*a* in at least any one of the toner waste dischargers 41 to 41 of a plurality of colors and the developing agent waste dischargers 21 to 21 of a plurality of colors (in the present example, the plurality of developing agent waste dischargers 21 to 21) can be accommodated in the powder collection container 300. That is, the configuration can be applied to a color image forming apparatus (100) using toners of a plurality of colors and developing agents of a plurality of colors.

Second Embodiment

Figure 9A:
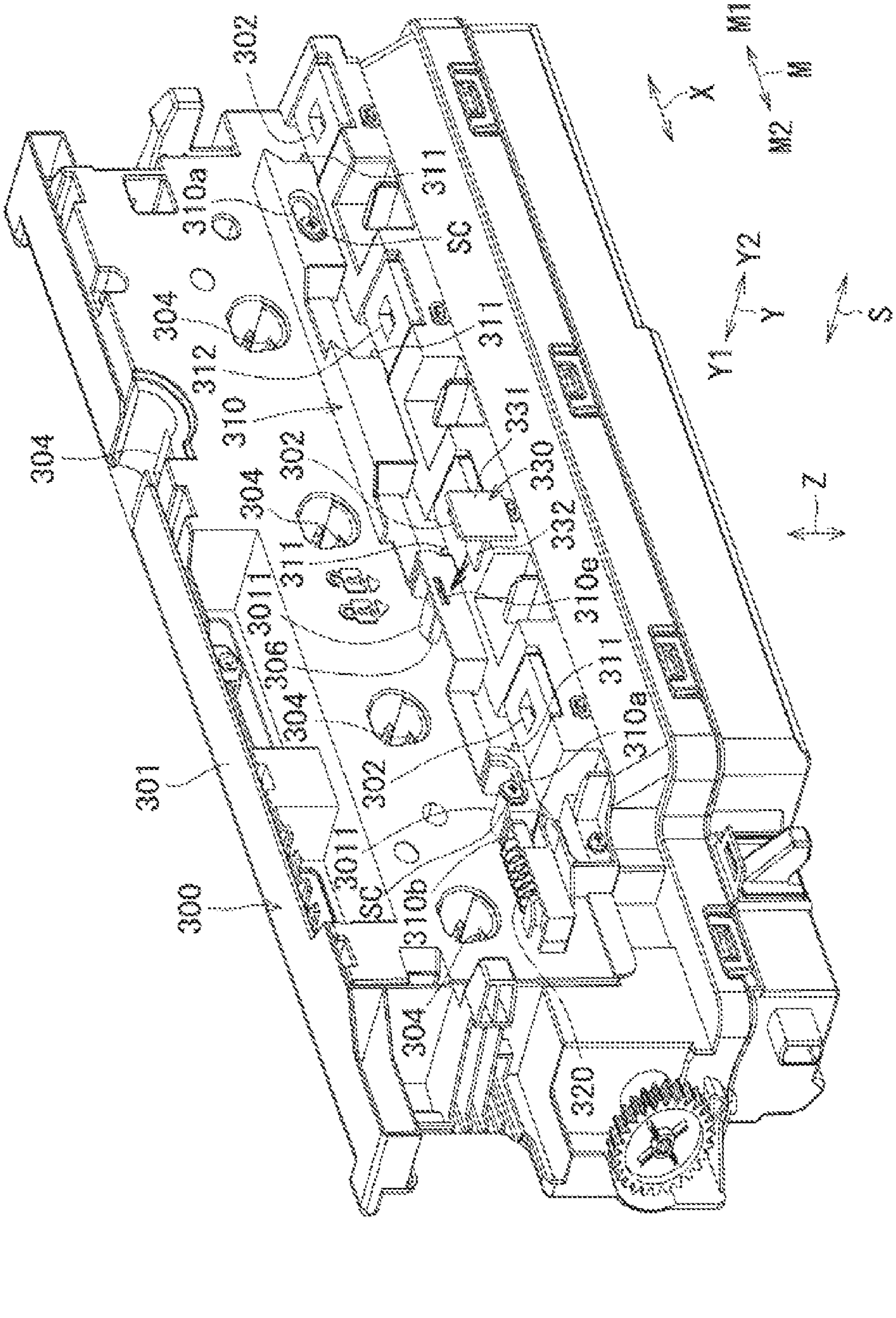
FIG. 9A is a perspective view obtained by cutting out a part of the moving member positioned at a first position in the powder collection container illustrated in FIG. 3.
Figure 9B:
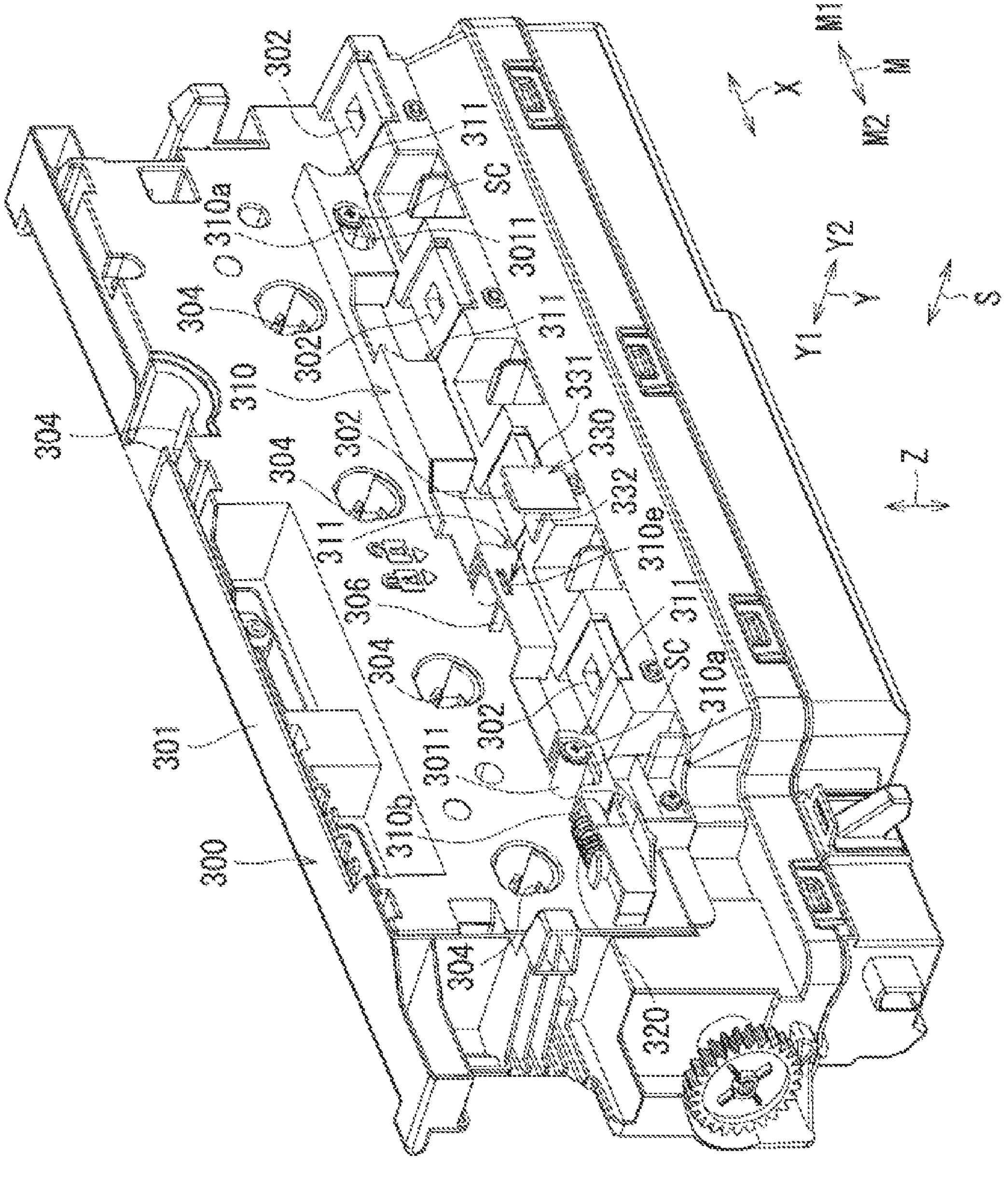
FIG. 9B is a perspective view obtained by cutting out a part of the moving member positioned at a second position in the powder collection container illustrated in FIG. 3.
Figure 10:
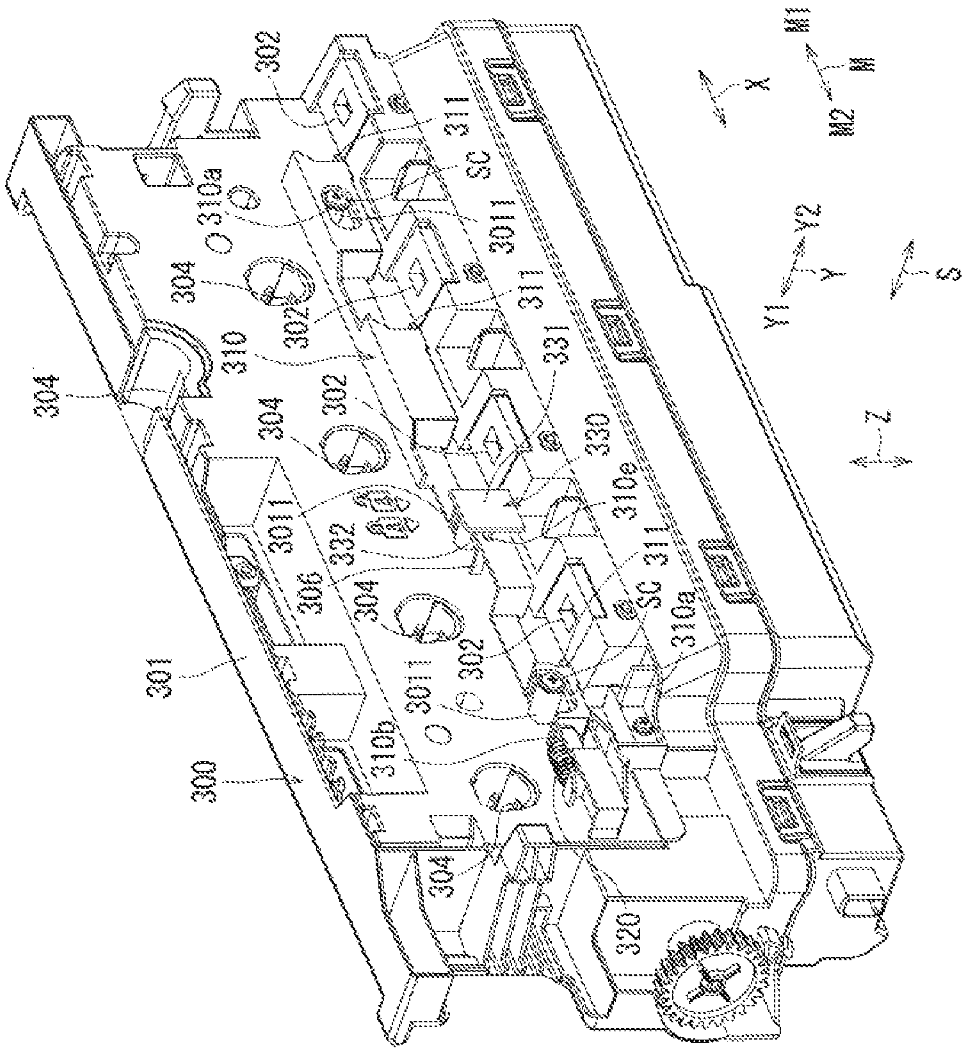
FIG. 10 is a perspective view illustrating a state where a stopper member is inserted into a through-hole in the state illustrated in FIG. 9B.

FIGS. 9A and 9B are perspective views obtained by cutting out a part of the moving member 310 positioned at the first position and at the second position in the powder collection container 300 illustrated in FIG. 3, respectively. FIG. 10 is a perspective view illustrating a state where a stopper member 330 is inserted into a through-hole 310*e* in the state illustrated in FIG. 9B.

It is desired to surely maintain the moving member 310 in the second position during the transportation of the image forming apparatus 100.

In this regard, in the present embodiment, the stopper member 330 (see FIGS. 9B and 10) that is attachable to and detachable from the powder collection container main body 301 is further provided. In a state where the stopper member 330 is attached to the powder collection container main body 301, the stopper member 330 regulates the movement of the moving member 310 to the first position by the urging force of the second urging member 320, and when the stopper member 330 is detached from the powder collection container main body 301, the stopper member 330 allows for the movement of the moving member 310 to the first position by the urging force of the second urging member 320.

Thus, in the state where the stopper member 330 is attached to the powder collection container main body 301 by an operator, the moving member 310 positioned at the second position can be surely maintained at the second position by the stopper member 330. When the stopper member 330 is detached from the powder collection container main body 301 by the operator, the moving member 310 positioned at the second position can be moved to the first position by the urging force of the second urging member 320. At this time, if the regulator 305 is provided in the powder collection container main body 301 and the regulated portion 312 is provided in the moving member 310 as in the present embodiment (see FIG. 8B), the urging force of the second urging member 320 allows the regulated portion 312 of the moving member 310 to pass over the regulator 305 of the powder collection container main body 301. In the present example, the regulated portion 312 includes an inclined surface 312*b* (see FIG. 8B) that is inclined to be lower toward a first position side M1 in the movement direction M. In such a configuration, when the moving member 310 positioned at the second position is moved to the first position by the urging force of the second urging member 320, the inclined surface 312*b* of the moving member 310 abuts against the regulator 305 of the powder collection container main body 301 and the swinger 313 elastically deforms to the opposite side of the regulator 305. At this time, the regulated portion 312 passes over the regulator 305, and the swinger 313 returns to an original position. Thus, the regulated portion 312 is regulated by the regulator 305.

In the present embodiment, the powder collection container main body 301 is provided with a protrusion 306 that protrudes toward the moving member 310. The moving member 310 is provided with the through-hole 310*e* adjacent on the first position side M1 in the movement direction M when the moving member 310 is positioned at the second position. When the moving member 310 is positioned at the second position, the stopper member 330 is attachably and detachably inserted into the through-hole 310*e* and abuts against the protrusion 306 to regulate the movement of the moving member 310 to the first position.

Thus, to regulate the movement of the moving member 310 to the first position, the stopper member 330 can be easily inserted into the through-hole 310*e* in a state where the moving member 310 is positioned at the second position. Tb permit the movement of the moving member 310 to the first position, the stopper member 330 can be easily pulled out from the through-hole 310*e*. Thus, the stopper member 330 can be attached to and detached from the powder collection container main body 301 by a simple operation by the operator.

Specifically, the through-hole 310*e* of the moving member 310 is formed in a slit shape along the movement direction M. In the stopper member 330, an insertion piece 332 to be inserted into the through-hole 310*e* is erected from a stopper member main body 331 toward the powder collection container main body 301. The stopper member main body 331 is formed in a plate shape along both the movement direction M and the up-down direction Z. The insertion piece 332 is formed in a plate shape along both the movement direction M and the attachment/detachment direction S. The stopper member main body 331 and the insertion piece 332 are integrally formed. Thus, a space occupied by the stopper member main body 331 when the insertion piece 332 is inserted into the through-hole 310*e* can be designed as small as possible. A size of the through-hole 310*e* in the movement direction M is larger than a size of the insertion piece 332 in the movement direction M by a predetermined distance so that the insertion piece 332 can be smoothly inserted into the through-hole 310*e*. Thus, the moving member 310 can be surely maintained in the second position when the insertion piece 332 is inserted into the through-hole 310*e*.

Third Embodiment

Figure 11:
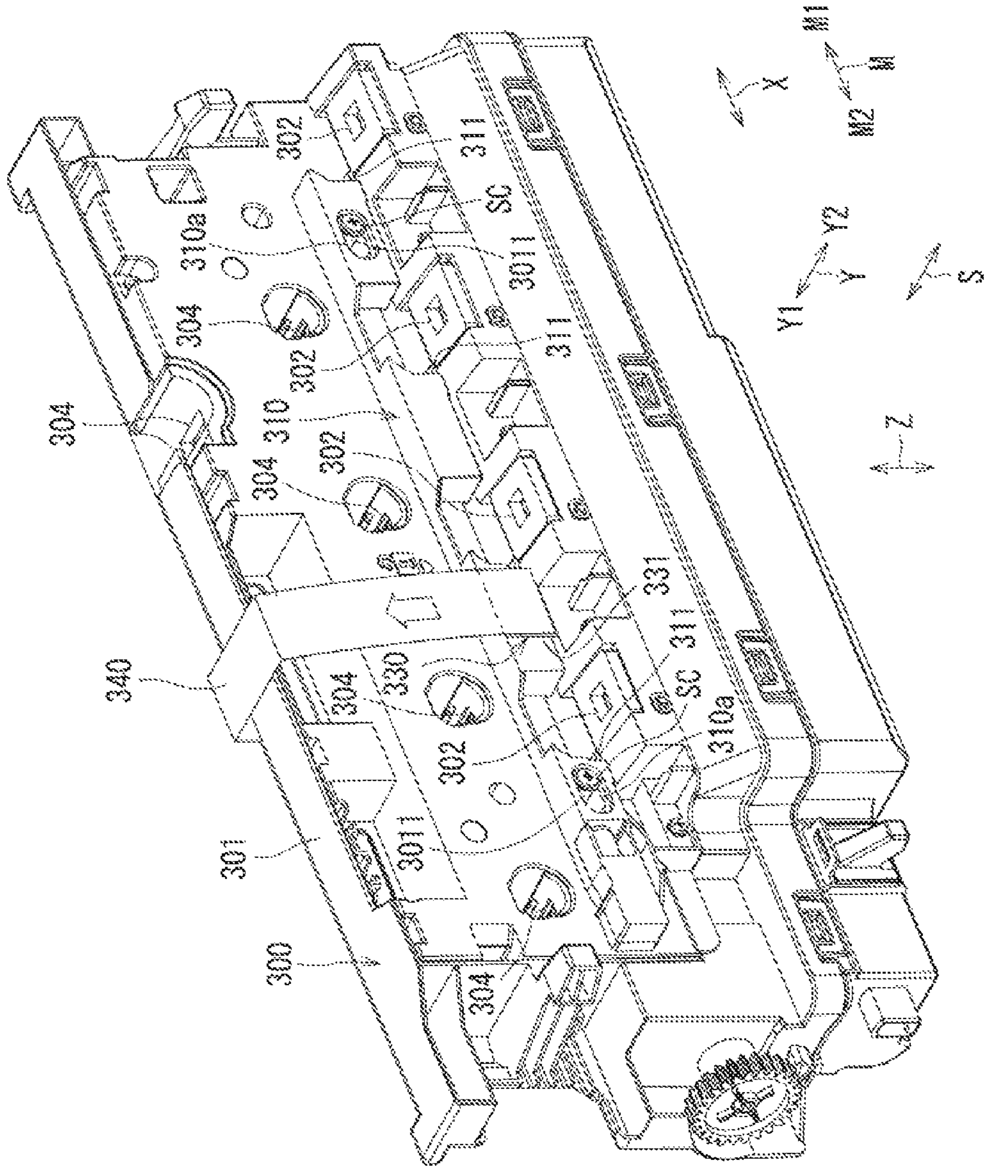
FIG. 11 is a perspective view illustrating a state where a sheet is provided in the stopper member inserted into the through-hole in the powder collection container.

FIG. 11 is a perspective view illustrating a state where a sheet 340 is provided in the stopper member 330 inserted into the through-hole 310*e* in the powder collection container 300.

It is necessary to remove the stopper member 330 to install the image forming apparatus 100, but the operator may find it difficult to understand the position of the stopper member 330.

In this regard, in the present embodiment, the stopper member 330 is provided with the long sheet 340. In the present example, the long sheet 340 is adhered to the stopper member 330 by an adhesive member (specifically, a double-sided adhesive sheet).

Thus, when the image forming apparatus 100 is being installed, the sheet 340 can attract the operator's attention and the operator can recognize that the stopper member 330 should be detached from the powder collection container main body 301.

Here, the color of the sheet 340 is a color by which the operator easily recognizes that the stopper member 330 should be removed during installation, and in the present example, the color is red. The length of the sheet 340 can be chosen so that the sheet 340 protrudes to the outside when the powder collection container 300 which is an exterior cover is attached to the image forming apparatus main body 110. Examples of the material of the sheet 340 include paper and resin.

Fourth Embodiment

Figure 12:
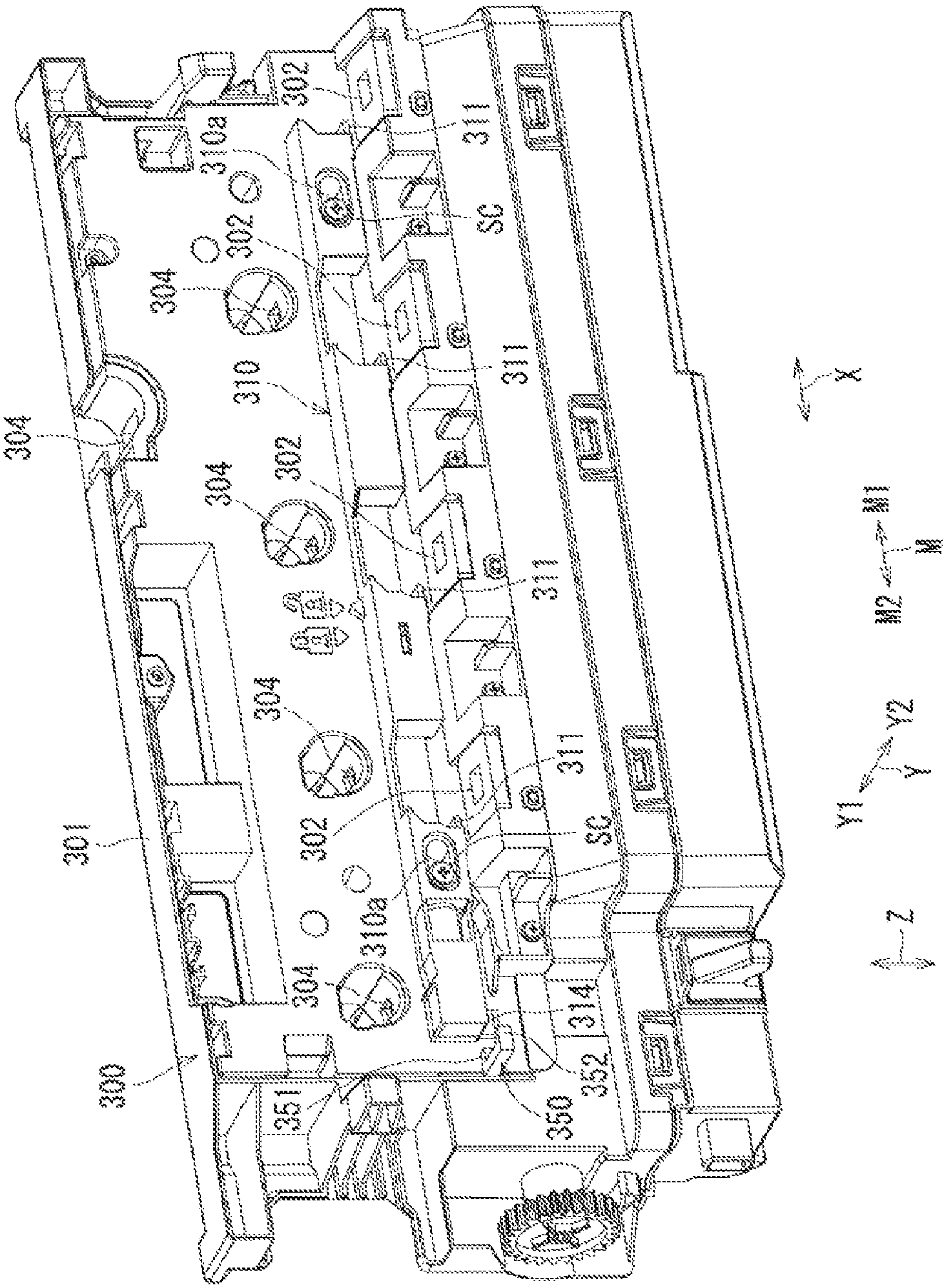
FIG. 12 is a perspective view illustrating a detection target and a detector that detects the detection target in the moving member of the powder collection container.

FIG. 12 is a perspective view illustrating a detection target 314 and a detector 350 that detects the detection target 314 in the moving member 310 of the powder collection container 300.

After the image forming apparatus 100 is installed, if the operator forgets to position the moving member 310 in the first position and the moving member 310 remains in the second position, an image forming operation will be performed in a state where the discharge port 21*a* is not opened by the shutter member 211 in the powder discharger (21). Thus, an unwanted situation may occur, such as the powder F clogging in the powder discharger (21), and as a result, the powder discharge device (the developing devices 2BK, 2C, 2M, and 2Y) being locked.

In this regard, in the present embodiment, the image forming apparatus 100 includes the detector 350 that detects whether the moving member 310 is positioned at the first position and/or the second position (the second position in the present example).

Thus, even if the operator forgets to position the moving member 310 in the first position, when the detector 350 detects that the moving member 310 is positioned at the second position (and/or is not positioned at the first position), the image forming apparatus 100 can announce to the operator that the moving member 310 is positioned at the second position, and further, restrict the image forming operation. That is, the image forming apparatus 100 may include a notifier that announces to the operator that the moving member 310 is positioned at the second position when the detector 350 detects that the moving member 310 is positioned at the second position (and/or is not positioned at the first position), and may further include a restriction controller that restricts the image forming operation.

Specifically, the moving member 310 is provided with the detection target 314 to be detected by the detector 350. The detector 350 is provided at a position corresponding to the detection target 314 of the moving member 310 in the image forming apparatus main body 110. In the present example, the detection target 314 is provided at the end of the moving member 310 on the second position side in the movement direction M. The detector 350 detects whether the detection target 314 is present. The detector 350 is an optical sensor that detects an optical change depending on whether the detection target 314 is present. In the present example, the detector 350 includes a light emitter 351 and a light receiver 352. The detector 350 detects whether the detection target 314 is present between the light emitter 351 and the light receiver 352.

The detector 350 is electrically connected to an input system of a controller 400 (see FIG. 1). The detector 350 transmits, to the controller 400, a first signal (ON signal) when the detection target 314 is not present between the light emitter 351 and the light receiver 352. The detector 350 transmits, to the controller 400, a second signal (OFF signal) when the detection target 314 is present between the light emitter 351 and the light receiver 352. Thus, the controller 400 can detect whether the moving member 310 is positioned at the first position and/or the second position (the second position in the present example).

The controller 400 includes a notifier and a restriction controller. When the power is turned on to activate the image forming apparatus 100 and the detector 350 detects that the moving member 310 is positioned at the second position (and/or is not positioned at the first position), the notifier displays a message on a display screen of a display (not illustrated) provided in the image forming apparatus main body 110, and/or turns on a warning light (LED), and/or emits a warning sound. When the detector 350 detects that the moving member 310 is positioned at the second position (and/or is not positioned at the first position), the restriction controller restricts the image forming operation, even if a user instructs the image forming operation.

The present disclosure is not limited to the embodiments described above, and may be implemented in various other forms. Thus, the embodiments are merely examples in all respects and should not be interpreted in a limiting manner. The scope of the present disclosure is defined by the claims, and is not restricted by the description of the specification in any way. All modifications and changes belonging to a scope equivalent to the claims are included within the scope of the present disclosure.

What is claimed is:

1. A powder collection container for accommodating a powder discharged from a discharge port of a powder discharge device comprising a powder discharger provided with a shutter member that opens and closes the discharge port, the powder collection container comprising:

a moving member that is movable between a first position where the moving member abuts against the shutter member to open the discharge port of the powder discharge device, and a second position where the moving member does not abut against the shutter member and the discharge port of the powder discharge device is not opened;

a first urging member that urges the moving member toward the first position; and a stopper member that is attachable to and detachable from a powder collection container main body, wherein:

the moving member is provided movably in a predetermined movement direction in the powder collection container main body, in a state in which the moving member is urged toward the first position by an urging force of the first urging member, in a state in which the stopper member is attached to the powder collection container main body, the stopper member regulates a movement of the moving member to the first position by the urging force of the first urging member, and when the stopper member is detached from the powder collection container main body, the stopper member allows for the movement of the moving member to the first position by the urging force of the first urging member, the powder collection container main body is provided with a protrusion that protrudes toward the moving member, the moving member is provided with a through-hole adjacent to a first position side in the predetermined movement direction when the moving member is positioned at the second position, and when the moving member is positioned at the second position, the stopper member is attachably and detachably inserted into the through-hole and abuts against the protrusion to regulate the movement of the moving member to the first position.

2. The powder collection container according to claim 1, wherein the shutter member is provided movably in a predetermined opening/closing direction in a powder discharger main body, the powder discharger is provided with a second urging member that urges the shutter member to a closed side, and when the moving member is positioned at the first position, the moving member abuts against the shutter member to move the shutter member to an open side against an urging force by the second urging member toward the closed side of the shutter member, and when the moving member is positioned at the second position, the moving member does not abut against the shutter member and a state in which the shutter member is closed by the second urging member is maintained.

3. The powder collection container according to claim 1, wherein the powder collection container main body is provided with a regulator that regulates a movement of the moving member at the first position toward the second position in the predetermined movement direction, and the moving member is provided with a regulated portion that is releasably regulated with respect to the regulator.

4. The powder collection container according to claim 1, wherein the stopper member is provided with a long sheet.

5. The powder collection container according to claim 1, wherein the powder discharger is at least one of a toner waste discharger that discharges toner waste and a developing agent waste discharger that discharges developing agent waste.

6. The powder collection container according to claim 5, wherein a plurality of toner waste dischargers including the toner waste discharger and a plurality of developing agent waste dischargers including the developing agent waste discharger are provided, and when the moving member is positioned at the first position, the moving member abuts against all of the shutter members in at least one of the plurality of toner waste dischargers or the plurality of developing agent waste dischargers, to open all discharge ports, and when the moving member is positioned at the second position, the moving member does not abut against any of the shutter members and none of the discharge ports is opened.

7. An image forming apparatus comprising the powder collection container according to claim 1.

8. The image forming apparatus according to claim 7, comprising:

a detector that detects whether the moving member is positioned at the first position and/or the second position.

* * * * *